시010148840B2

United States Patent
Kobayashi (10) Patent No.: US 10,148,840 B2
(45) Date of Patent: Dec. 4, 2018

(54) IMAGE FORMING APPARATUS WITH HUMAN BODY SENSOR

(71) Applicant: KONICA MINOLTA, INC., Chiyoda-ku, Tokyo (JP)

(72) Inventor: Kiyohiko Kobayashi, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 96 days.

(21) Appl. No.: 15/475,325

(22) Filed: Mar. 31, 2017

(65) Prior Publication Data

US 2017/0318175 A1  Nov. 2, 2017

(30) Foreign Application Priority Data

Apr. 28, 2016  (JP) ................. 2016-091715

(51) Int. Cl.
*G06F 1/32* (2006.01)
*H04N 1/00* (2006.01)
*G06F 3/044* (2006.01)

(52) U.S. Cl.
CPC ....... *H04N 1/00896* (2013.01); *G06F 1/3231* (2013.01); *G06F 3/044* (2013.01); *H04N 1/00392* (2013.01); *H04N 1/00496* (2013.01); *G06F 2203/04108* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 8,254,800 B2* | 8/2012 | Oyoshi | .............. | G03G 15/5004 399/79 |
| 9,118,792 B2* | 8/2015 | Miyamoto | ......... | H04N 1/00896 |
| 9,160,876 B2* | 10/2015 | Tanisaki | ............. | H04N 1/00323 |
| 9,179,015 B2* | 11/2015 | Funakawa | ......... | H04N 1/00127 |
| 9,235,178 B2* | 1/2016 | Hashimoto | ........ | G03G 15/5004 |
| 9,740,270 B2* | 8/2017 | Kurahashi | ................. | G01J 5/10 |
| 2013/0128298 A1* | 5/2013 | Yamada | ................. | G06K 15/02 358/1.13 |

FOREIGN PATENT DOCUMENTS

JP     2013-080114 A     5/2013

* cited by examiner

*Primary Examiner* — Paul F Payer
(74) *Attorney, Agent, or Firm* — Buchanan Ingersoll & Rooney PC (57) ABSTRACT

An image forming apparatus includes a capacitive human body sensor that detects an operation to return to a normal mode from a power saving mode consuming less power than the normal mode, wherein an antenna of the human body sensor is wired along a periphery of a predetermined detection target area which can receive the operation to return from a user, and a difference in sensitivity between a corner portion and a part other than the corner portion of the antenna is reduced by shaping the antenna at least to be wired in a curve without forming a corner in the corner portion, to be thinner in the corner portion than in the part other than the corner portion, or to be wired without meandering in the corner portion and wired while meandering in the part other than the corner portion.

7 Claims, 10 Drawing Sheets

PART OF ANTENNA INCLUDED IN AREA B ━━
PART OF ANTENNA INCLUDED IN AREA A ━━

IMAGE FORMING APPARATUS WITH HUMAN BODY SENSOR

The entire disclosure of Japanese Patent Application No. 2016-091715 filed on Apr. 28, 2016 including description, claims, drawings, and abstract are incorporated herein by reference in its entirety.

BACKGROUND OF THE INVENTION

Field of the Invention

The present invention relates to an image forming apparatus including a capacitive human body sensor that detects an operation to return to a normal mode from a power saving mode consuming less power than the normal mode.

Description of the Related Art

In an attempt to reduce power consumption, an image forming apparatus performs power control to shift to a power saving mode, in which power supply to a part of the apparatus is stopped, when the apparatus remains unused for a certain period of time. In general, the apparatus returns to a normal mode from the power saving mode upon detecting that a user has operated an operation panel of the apparatus. The operation to return to the normal mode from the power saving mode is detected, in a related art, by scanning a key or a touch panel on the operation panel at all times by an operation detection circuit disposed within the operation panel.

In recent years, however, it is requested to also stop power supply to the operation detection circuit in order to further reduce power consumption in the power saving mode. Accordingly, a method of using a capacitive human body sensor (refer to JP 2013-80114 A) has been proposed as a method of detecting the return operation by a user with less power consumption than that of the operation detection circuit.

Figure 9:
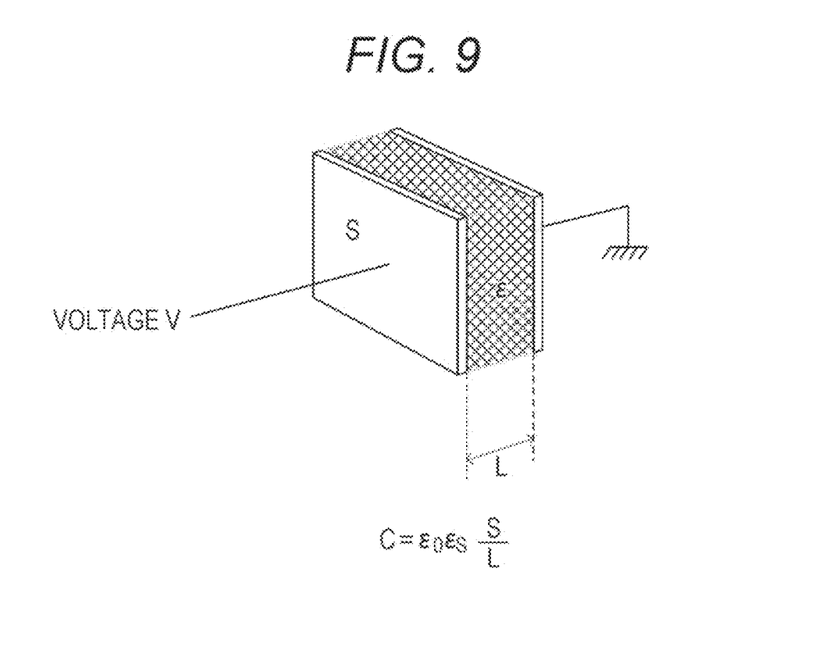
FIG. 9 is a diagram illustrating a mechanism of how capacitance is generated.

The capacitive human body sensor detects the proximity of a human hand or the like by using a change in storage capacity of electrical energy called capacitance. The capacitance is always generated between two conductors arranged in space. The capacitance is generated when a voltage is applied to two metal plates (conductors) arranged in parallel, as illustrated in FIG. 9. A value (C) of the capacitance is determined by a distance (L) between the two conductors, an area (S), and a property (permittivity) of an insulator between the conductors. The capacitance satisfies the relationship $C = \varepsilon_0 \varepsilon_s \times S \div L$ when the insulator between the conductors is air. Note that $\varepsilon_0$ represents the permittivity of a vacuum, and $\varepsilon_s$ represents the permittivity of air.

Figure 10:
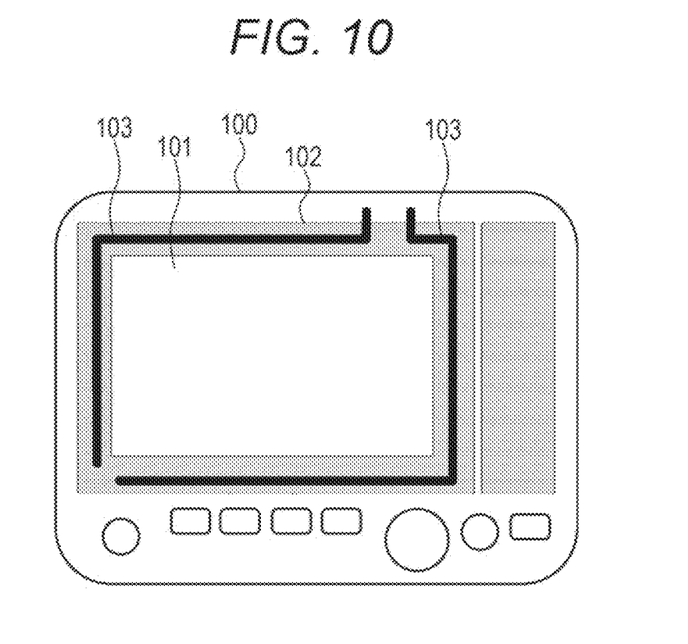
FIG. 10 is a diagram illustrating an example of an antenna that is wired along a bezel (outer frame) of a touch panel provided on a display of an operation panel.

When the human body sensor is installed on an operation panel, as illustrated in an example of FIG. 10, an antenna 103 is wired along a bezel (an outer frame) 102 of a touch panel provided on a display 101 of an operation panel 100, and a detection circuit is provided on a circuit board of the operation panel 100.

Figure 11:
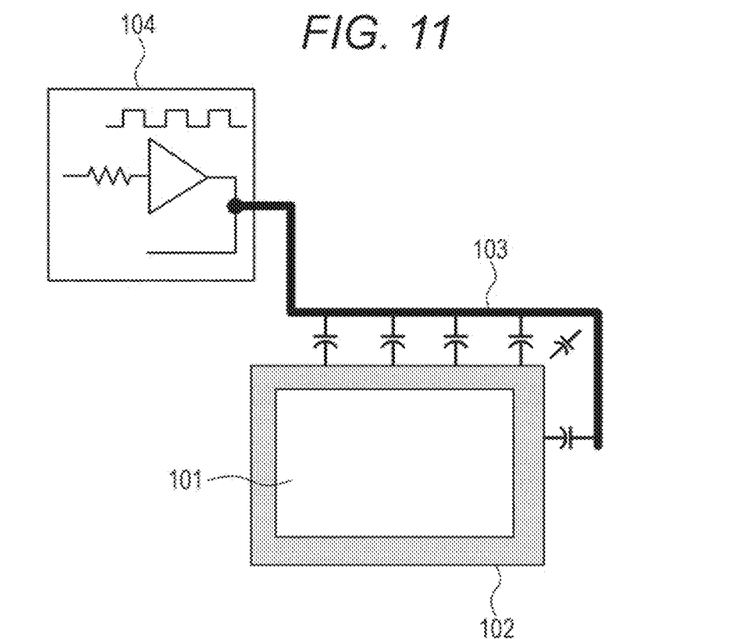
FIG. 11 is a diagram schematically illustrating the capacitance generated between a detection circuit as well as the antenna and a frame of the touch panel.

As illustrated in FIG. 11, a detection circuit 104 outputs a voltage pulse to the antenna 103 being connected. Capacitance as well as resistance components are present between/in the antenna 103 and a nearby conductor such as the frame 102 or a sheet metal portion of the touch panel and a metal portion such as a frame holding the operation panel, thereby being equivalent to an RC circuit connected to the detection circuit 104. The voltage pulse output from the detection circuit 104 to the antenna 103 thus causes repetitive charging and discharging of the RC circuit.

Figure 12:
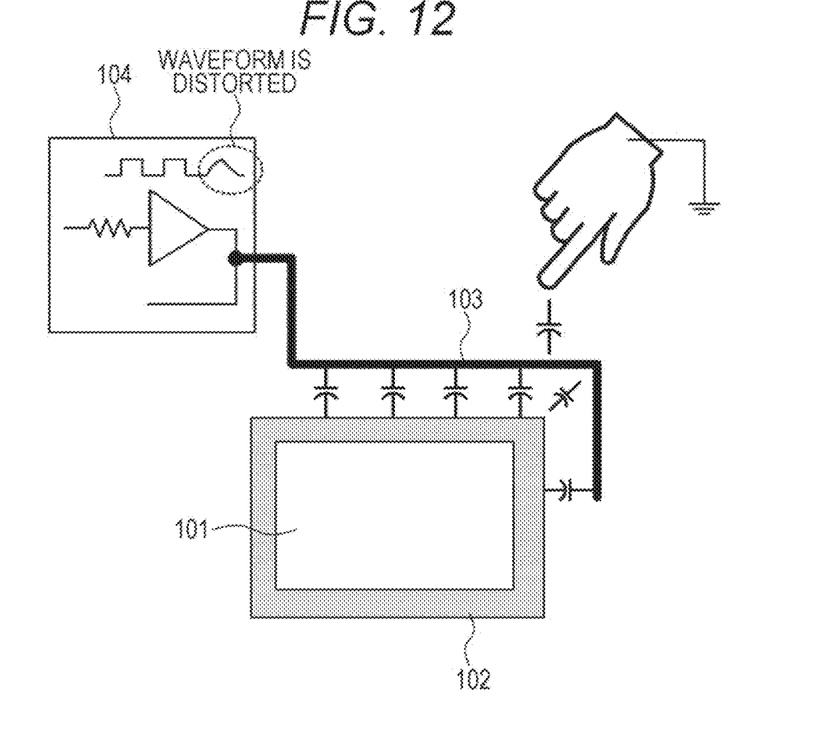
FIG. 12 is a diagram schematically illustrating how stray capacitance is generated when a hand or finger approaches the antenna.

When a finger or hand of a human body being a conductor approaches the antenna 103 as illustrated in FIG. 12, a few picofarads of stray capacitance (parasitic capacitance=capacitor) is generated between the finger or hand and the antenna 103. This causes an addition to the capacitance and thus a change in a charge/discharge behavior (time constant) of the RC circuit as well as slight distortion in the waveform of the voltage pulse as compared to when the finger or hand does not approach the antennae The detection circuit 104 detects that the human body has approached the antenna 103 on the basis of the change in the waveform of the voltage pulse.

Figure 13:
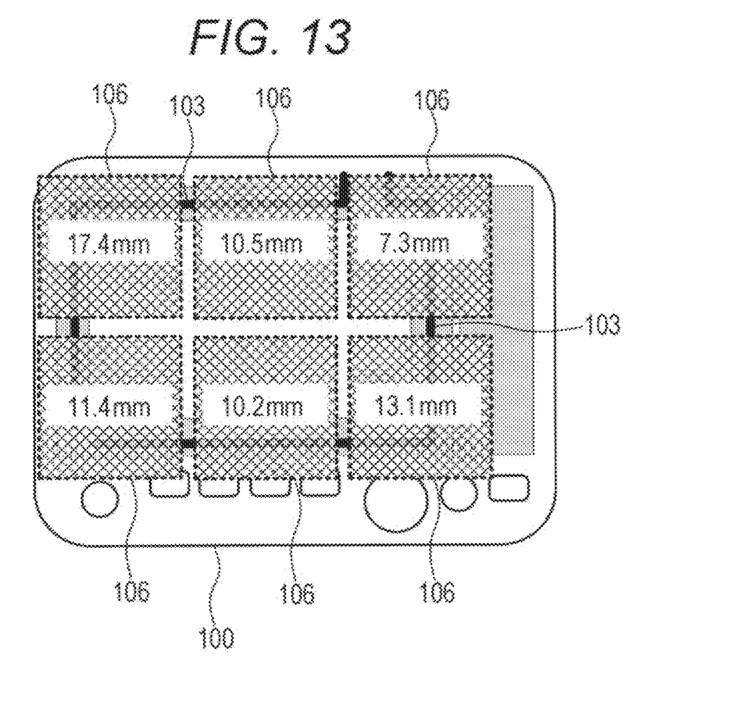
FIG. 13 is a diagram illustrating a distance at which a flat electrode likened to a human hand or finger is detected when the flat electrode approaches various parts of the antenna.

The same distance between the antenna and the finger or hand may result in different stray capacitances generated between the antenna and the nearby finger or hand depending on which part of the antenna the hand or finger approaches. When the antenna is wired along the periphery of a rectangular display (touch panel) of the operation panel, for example, the sensitivity in response to the finger or hand approaching a corner portion of the antenna is higher than the sensitivity in response to the finger or hand approaching a part other than the corner portion of the antenna. FIG. 13 illustrates distances at which the detection circuit 104 detects an approach of a flat electrode 106 (such as a 7 cm×7 cm metal plate), which is likened to a human hand or finger, at various parts of the antenna 103 when the flat electrode 106 approaches the various parts of the antenna provided on the operation panel 100. A longer distance indicates higher sensitivity.

Figure 14:
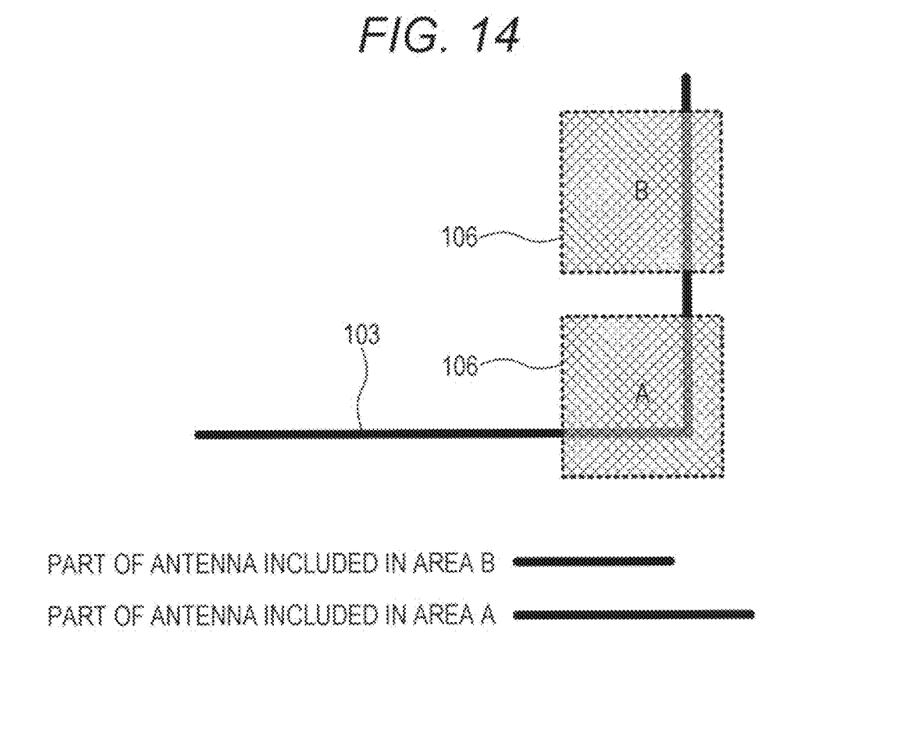
FIG. 14 is a diagram illustrating how the flat electrode is arranged is each of a corner portion and a part other than the corner portion of the antenna.

The sensitivity is higher in the corner portion of the antenna 103 supposedly because the area of the antenna 103 opposing the hand or finger is larger when the hand or finger approaches the corner portion of the antenna 103 than when the hand or finger approaches a part other than the corner portion of the antenna 103. As illustrated in FIG. 14, for example, the area of the antenna 103 included in a part opposing a flat electrode 106 (A), which is the flat electrode 106 likened to the hand or finger and approaching the corner portion of the antenna 103, is larger than the area of the antenna 103 included in a part opposing a flat electrode 106 (B), which is the flat electrode 106 approaching a part other than the corner portion of the antenna 103.

Figure 15:
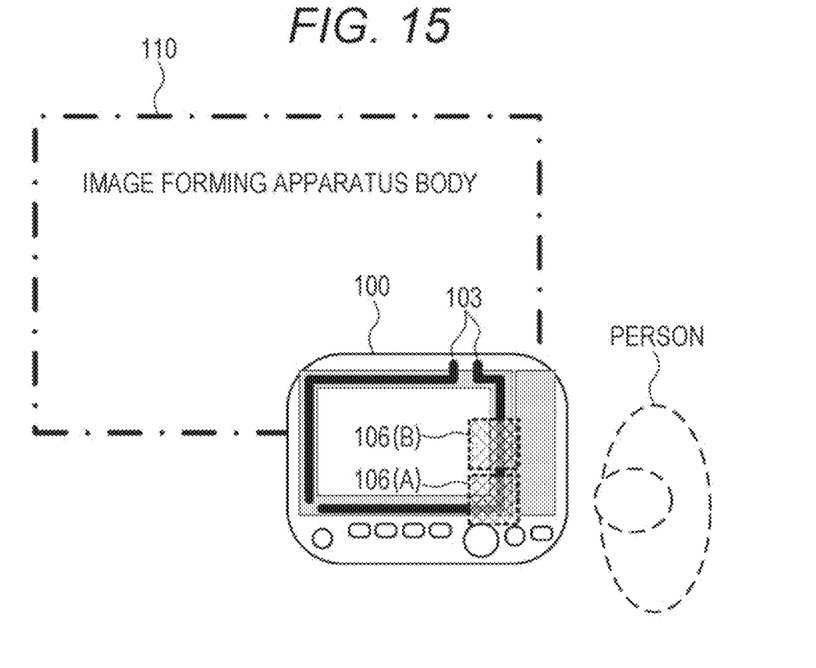
FIG. 15 is a diagram illustrating a situation where a human stands on a right side of an image forming apparatus equipped with the operation panel on a right edge of the apparatus.

Being adapted to detect an operation to return the image forming apparatus such as a multifunction peripheral to the normal mode from the power saving mode, the human body sensor does not want to falsely detect the return operation when a person simply stands right by the image forming apparatus. The image forming apparatus in many cases discharges printed paper to the center or the left side of the apparatus, so that the operation panel may be installed on the right edge of the front face of the apparatus in order to not get in the way of paper collection. In this case, as illustrated in FIG. 15, a person simply standing on the right side of an image forming apparatus 110 such as a multifunction peripheral, namely on the right side of an operation panel 100 installed on the right edge of the front face of the image forming apparatus 110, can be falsely detected by the corner portion of the antenna 103 having high sensitivity.

The sensitivity of the detection circuit 104 need thus be set so as to not cause such false detection in a part with the highest sensitivity, or in the corner portion of the antenna 103 in the aforementioned example. However, a large difference between the sensitivity in the corner portion and the sensitivity in the part other than the corner portion causes the sensitivity in the part other than the corner portion to be too low.

Figure 16:
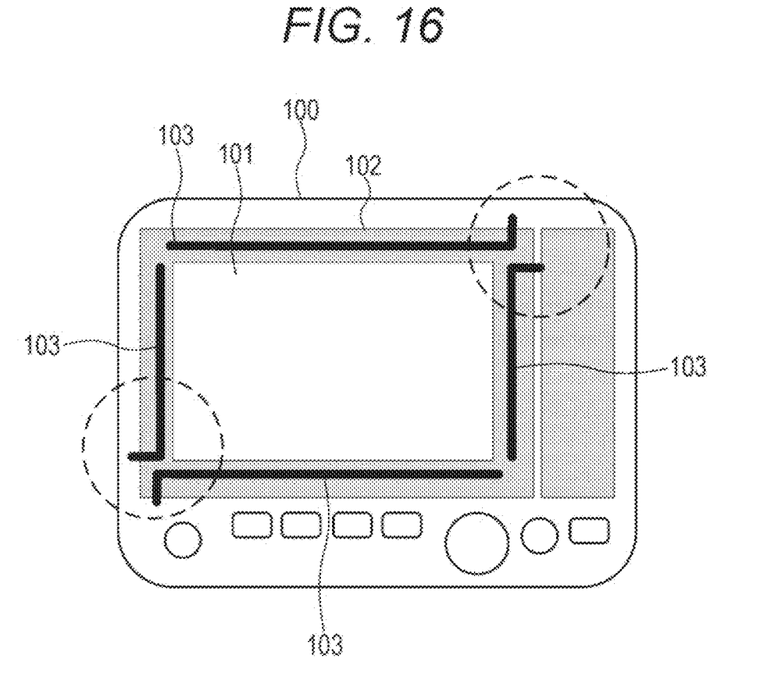
FIG. 16 is a diagram illustrating an example of the antenna that is wired so as not to form a corner portion.
Figure 17:
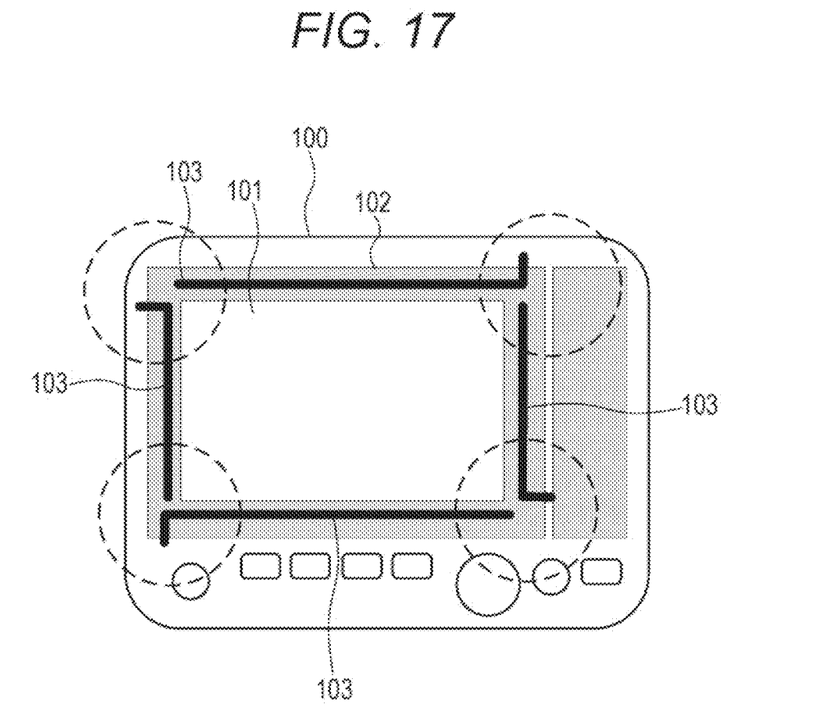
FIG. 17 is a diagram illustrating another example of the antenna that is wired so as not to form the corner portion.

One may avoid wiring the antenna 103 in the corner portion if the wiring in the corner portion becomes a problem, in which case the wiring is arranged as illustrated in FIGS. 16 and 17. In this case, the detection circuit 104 is required at each site indicated by a dotted circle in the figures, where the installation of a plurality (four in this example) of the detection circuits 104 results in the increase in cost and current consumption and thus a reduced effect of the power saving mode.

SUMMARY OF THE INVENTION

The present invention has been made to solve the aforementioned problems, and an object of the present invention is to provide an image forming apparatus that includes a capacitive human body sensor detecting a return operation from a power saving mode, and has a reduced difference in sensitivity between a corner portion and another part of an antenna of the human body sensor.

The summary of the present invention for achieving the above object lies in the following aspects of the invention.

[1] To achieve the abovementioned object, according to an aspect, an image forming apparatus reflecting one aspect of the present invention comprises a capacitive human body sensor that detects an operation to return to a normal mode from a power saving mode consuming less power than the normal mode, wherein an antenna of the human body sensor is wired along a periphery of a predetermined detection target area which can receive the operation to return from a user, and a difference in sensitivity between a corner portion and a part other than the corner portion of the antenna is reduced by shaping the antenna at least to be wired in a curve without forming a corner in the corner portion, to be thinner in the corner portion than in the part other than the corner portion, or to be wired without meandering in the corner portion and wired while meandering in the part other than the corner portion.

According to the aspect of the above invention, the difference in the sensitivity is reduced by shaping the antenna at least to be wired in the curve without forming the corner in the corner portion, to be thinner in the corner portion than in the part other than the corner portion, or to be wired without meandering in the corner portion and wired while meandering in the part other than the corner portion, because the sensitivity in the corner portion becomes higher than the sensitivity in the part other than the corner portion when the antenna with the uniform thickness is wired along the detection target area having corners, such as a rectangle, while forming a corner in the corner portion.

[2] To achieve the abovementioned object, according to an aspect, an image forming apparatus reflecting one aspect of the present invention comprises a capacitive human body sensor that detects an operation to return to a normal mode from a power saving mode consuming less power than the normal mode, wherein an antenna of the human body sensor is wired along a periphery of a predetermined detection target area which can receive the operation to return from a user, and a difference in sensitivity between a corner portion and a part other than the corner portion of the antenna is reduced by setting the shape of each part of the antenna so as to have a reduced difference in areas of the antenna included in a predetermined flat area between when the flat area is arranged in the corner portion of the antenna and when the flat area is arranged in the part other than the corner portion of the antenna, the flat area corresponding to a human hand or finger that performs the operation to return.

According to the aspect of the above invention, the difference in the sensitivity of the antenna between the corner portion and the part other than the corner portion depends on the difference between the stray capacitance that is generated between the antenna and the human hand approaching the corner portion, and the stray capacitance that is generated between the antenna and the human hand or finger approaching the part other than the corner portion until the distance therebetween corresponds with the distance between the human hand or finger and the corner portion. The stray capacitance has a value corresponding to the area of the part of the antenna that opposes the approaching hand or finger. Accordingly, the difference in the sensitivity between the corner portion and the part other than the corner portion of the antenna is reduced by setting the shape of each part of the antenna so as to reduce the difference between the area of the antenna included in a predetermined flat area, corresponding to the human hand or finger performing the return operation and arranged in the corner portion of the antenna, and the area of the antenna included in the flat area arranged in the part other than the corner portion of the antenna.

[3] The image forming apparatus of Item. 2, wherein the antenna is preferably wired to form a corner in the corner portion, and the antenna is preferably thinner in the corner portion than in the part other than the corner portion to have the reduced difference in areas.

According to the aspect of the above invention, the antenna is thinner in the corner portion than in the part other than the corner portion to reduce the difference between the area of the antenna included in a predetermined area of the flat area arranged in the corner portion, and the area of the antenna included in the flat area arranged in the part other than the corner portion.

[4] The image forming apparatus of Item. 2, wherein the antenna is preferably wired in a curve without forming a corner in the corner portion to have the reduced difference in areas.

According to the aspect of the above invention, the antenna curving rather than forming the corner is reduced in length in the corner portion to thus result in the reduced area of the antenna included in the flat area arranged in the corner portion.

[5] The image forming apparatus of Item. 2, wherein the antenna is preferably wired without meandering in the corner portion and wired while meandering in the part other than the corner portion to have the reduced difference in areas.

According to the aspect of the above invention, the antenna is wired while meandering to result in the increased area of the antenna per unit length along the detection target area. The area of the antenna per unit length is increased in the part other than the corner portion by causing the antenna to meander not in the corner portion but in the part other than the corner portion, thereby resulting in the reduced difference between the area of the antenna included in the predetermined area of the flat area arranged in the corner portion, and the area of the antenna included in the flat area arranged in the part other than the corner portion.

[6] The image forming apparatus of any one of Items. 1 to 5, wherein
the detection target area is preferably set to an area in which an operation panel or a touch panel is arranged.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
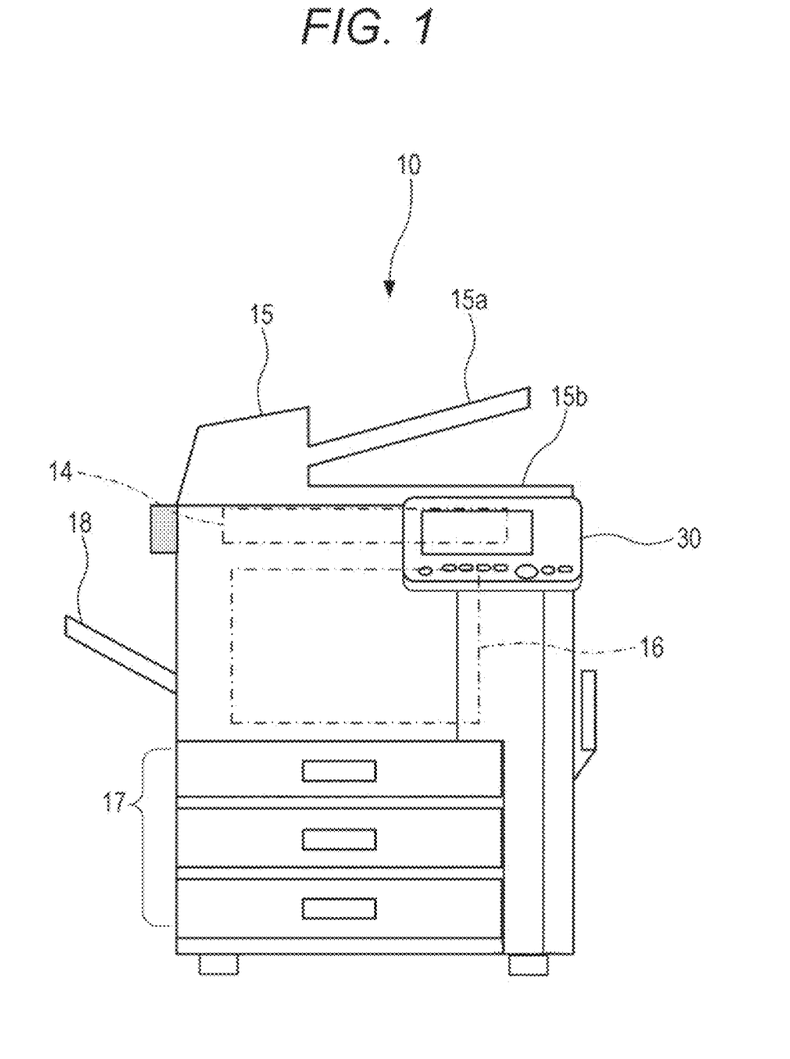
FIG. 1 is a front, view of an image forming apparatus according to an embodiment of the present invention.

FIG. 1 is a front view of an image forming apparatus 10 according to an embodiment of the present invention. The image forming apparatus 10 is a so-called multifunction peripheral having a plurality of functions such as: a copy function that optically reads a document and prints a copied image thereof onto recording paper; a scan function that stores image data of the document being read as a file or transmits the image data to an external terminal via a network; and a PC print function that forms, on recording paper, an image corresponding to print data received from the external terminal via the network and prints out the image.

The image forming apparatus 10 includes a plurality of paper feed trays 17 that is arranged at the bottom of the apparatus to be able to accommodate a large quantity of recording paper, and an image forming unit 16 that is arranged above the paper feed trays 17 inside a body of the apparatus to form an image on the recording paper sent out from the paper feed trays 17. The recording paper, on which the image is formed in the image forming unit 16, is discharged to a paper discharge tray 18 provided on the left side of the apparatus 10 as viewed from the front thereof. An image reading unit 14 that optically reads a document is provided above the image forming unit 16 inside the body of the apparatus, and, above the image reading unit, an automatic document feeder 15 is mounted to send out the documents stacked in a document tray 15a one sheet at a time and convey the document to a discharge tray 15b via a read position of the image reading unit 14. An operation panel 30 is provided on a right edge of the front side of the body of the image forming apparatus 10 to receive input of various operations from a user.

Figure 2:
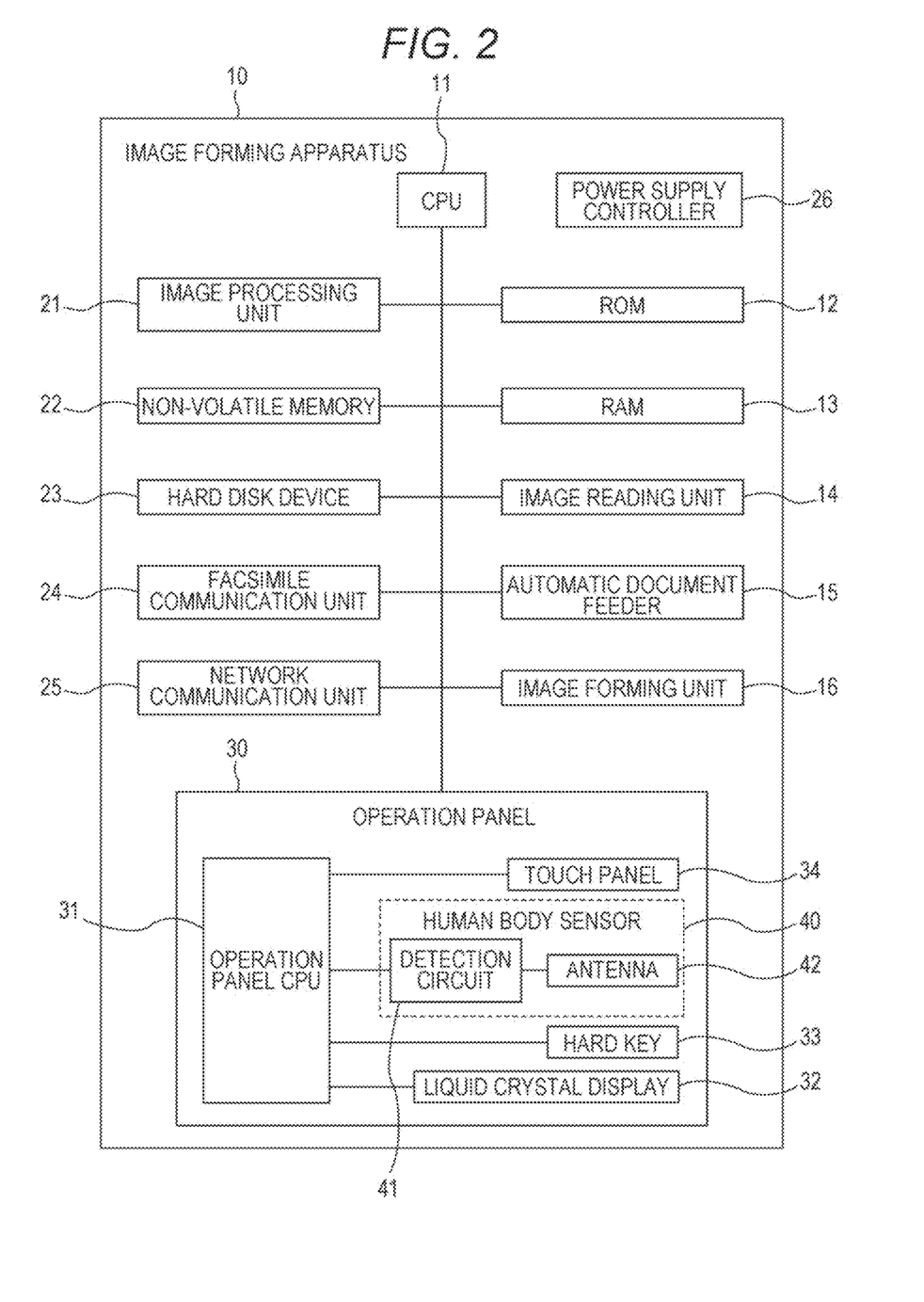
FIG. 2 is a block diagram illustrating a schematic configuration of the image forming apparatus according to an embodiment of the present invention.

FIG. 2 is a block diagram illustrating a schematic configuration of the image forming apparatus 10. The image forming apparatus 10 includes a central processing unit (CPU) 11 that collectively controls the operation of the image forming apparatus 10. A read only memory (ROM) 12, a random access memory (RAM) 13, the image reading unit 14, the automatic document feeder 15, the image forming unit 16, an image processing unit 21, a non-volatile memory 22, a hard disk device 23, a facsimile communication unit 24, a network communication unit 25, the operation panel 30 and the like are connected to the CPU 11 via a bus. The image forming apparatus 10 further includes a power supply controller 26 that performs control to supply or interrupt power to each unit in the apparatus.

The CPU 11 uses an operating system (OS) program as a base to run middleware, an application program and the like. The ROM 12 stores a boot program and the like The RAM 13 is used as a work memory that temporarily stores various kinds of data when the CPU 11 executes processing on the basis of a program, or as an image memory that stores image data.

The image reading unit 14 serves the function of optically reading a document and acquiring image data. The image reading unit 14 includes, for example: a light source that emits light to a document; a line image sensor that receives light reflected from the document and reads one line of the document in the width direction; a moving unit that sequentially moves a read position line by line in the longitudinal direction of the document; an optical path formed of a lens or a mirror that guides the light reflected from the document toward the line image sensor to form an image; and a converter that converts an analog image signal output from the line image sensor into digital image data.

The automatic document feeder 15 serves the function of sending out and conveying the documents set in the document tray 15a one sheet at a time from the topmost sheet, letting the document pass through the read position in the image reading unit 14, and discharging the document to a predetermined discharge position (the discharge tray 15b).

The image forming unit 16 serves the function of forming an image corresponding to image data on the recording paper. In this example, the image forming unit is configured as a so-called laser printer that includes a recording paper conveyor, a photosensitive drum, a charging unit, a laser unit, developing unit, a transfer/separation unit, a cleaning unit, and a fixing unit. The laser printer performs image formation by an electrophotographic process. The image formation may be performed by some other method.

The image processing unit 21 performs processing such as image scaling and rotation, rasterization that converts print data into image data, and image data compression/decompression.

The non-volatile memory 22 is a memory (flash memory) in which memory content is not destroyed even when the power is switched off, and is used to store various kinds of setting information and the like.

The hard disk device 23 is a high-capacity non-volatile storage device that stores various programs such as an OS program, middleware and an application program as well as an image file. The programs stored in the hard disk device 23 are developed in the RAM 13 when needed to be run by the CPU 11 and implement the functions of the image forming apparatus 10.

The facsimile communication unit 24 serves the function of transmitting and receiving image data to/from an external device equipped with a facsimile function through a public line or the like.

The network communication unit 25 serves the function of communicating with an external device via a network such as a local area network (LAN)

The operation panel 30 includes an operation panel. CPU 31, a liquid crystal display 32, a hard key 33, a touch panel 34, and a human body sensor 40. The liquid crystal display 32 displays various screens such as an operation screen and a setting screen. The hard key 33 can be a numeric keypad, a start button, a stop button, and/or a function selection button. The touch panel 34 is an electrode screen provided on a display surface of the liquid crystal display 32, and detects a coordinate position on the touch panel that is touched by a touch stylus or finger. The human body sensor 40 detects the presence and absence of a human body in a predetermined detection target area. The human body sensor 40 is a capacitive sensor similar to the one described in the description of the related art, and includes an antenna 42 and a detection circuit 41 connected to the antenna 42.

The liquid crystal display 32, the hard key 33, the touch panel 34, and the human body sensor 40 are all connected to the operation panel CPU 31 and controlled by the operation panel CPU 31. The operation panel CPU 31 receives input of an operation detection signal output from the hard key 33 and the touch panel 34, and a human body detection signal output from the detection circuit 41 of the human body sensor 40. Note that the detection signal output from the detection circuit 41 is input as an interrupt signal to the operation panel CPU 31.

The image forming apparatus 10 includes, as operation modes, a normal mode and a power saving mode that consumes less power than the normal mode. In the normal mode, each unit in the image forming apparatus 10 receives power supply to be operable. In the power saving mode, power is supplied to only the operation panel CPU 31 and the human body sensor 40 of the operation panel 30, but not to the other parts.

The image forming apparatus 10 shifts from the normal mode to the power saving mode when, for example, no job is executed and at the same time a non-operated state lasts for a certain period of time or longer in a standby state waiting for an operation from a user. Specifically, upon detecting that the non-operated state has lasted for the certain period of time or longer, the CPU 11 outputs an instruction for shifting to the power saving mode to the power supply controller 26 and the operation panel 30. The power supply controller 26 having received the instruction interrupts the power supply to the parts other than the operation panel CPU 31 and the human body sensor 40 of the operation panel 30. The operation panel CPU 31 having received the instruction shifts to a low power consumption mode which only monitors an interrupt signal. The power saving mode turns off the display on the liquid crystal display 32 while at the same time stopping the detection of an operation on the touch panel 34 and the hard key 33.

When the human body sensor 40 detects a human body (a human body performing a return operation to return to the normal mode; that is, a change in capacitance by a certain amount or more) in the power saving mode, the detection circuit 41 of the human body sensor 40 outputs an interrupt signal to the operation panel CPU 31. Upon receiving the interrupt signal, the operation panel CPU 31 leaves the low power consumption mode and shifts to the normal operation, thereby outputting a return instruction for returning to the normal mode to the power supply controller 26 and the CPU 11. The power supply controller 26 having received the return instruction resumes the power supply to each unit of the image forming apparatus 10. The CPU 11 booted up by the resumption of the power supply checks the return instruction from the operation panel CPU 31 and then performs predetermined return processing to return to the normal mode. As a result, the entire image forming apparatus 10 returns to the normal mode from the power saving mode and resumes a normal operation.

Note that the sequence of shifting from the normal mode to the power saving mode or returning to the normal mode from the power saving mode is not limited to the above example, where any return sequence may be used as long as the operation mode returns to the normal mode from the power saving mode in response to the detection of a human body by the detection circuit 41.

Figure 3:
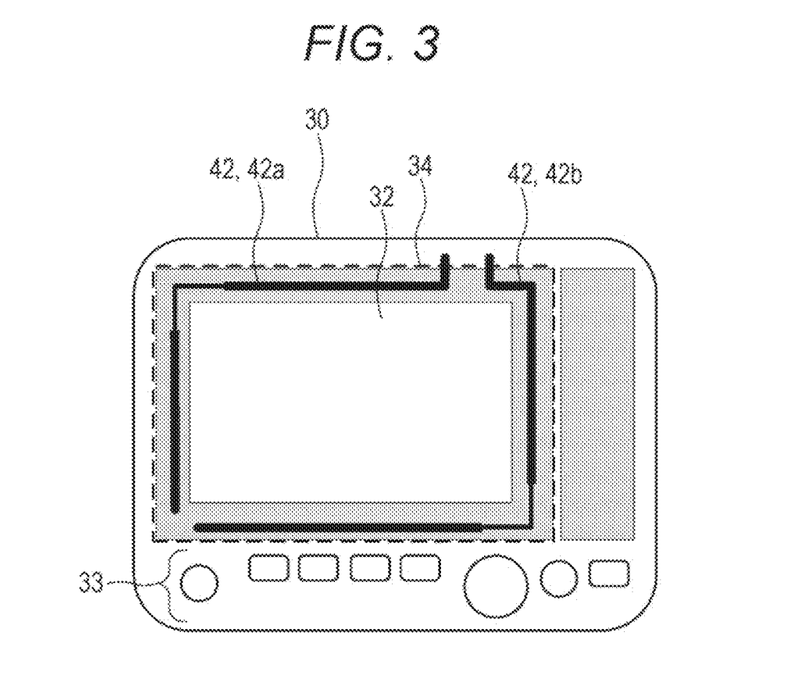
FIG. 3 is a diagram illustrating a front side of an operation panel and an antenna of a human body sensor that is provided on the operation panel.

FIG. 3 is a diagram illustrating an example of the front side of The operation panel 30 and the antenna 42 of the human body sensor 40 that is provided on the operation panel 30. The antenna 42 of the human body sensor 40 is made of a linear conductor and is wired along the periphery of the detection target area which can receive a return operation from a user. Here, the detection target area is the display surface (display area) of the liquid crystal display 32 and has an oblong shape with four corners. The liquid crystal display 32 is eight inches in size, for example.

The antenna 42 illustrated in FIG. 3 is formed of a first antenna 42a and a second antenna 42b separately, each of which is provided with the corresponding detection circuit 41. The first antenna 42a is wired along one long side and one short side of the oblong detection target area in a substantially L-shape to form a corner portion. The second antenna 42b is wired along the other long side and the other short side of the oblong detection target area in a substantially L-shape to form a corner portion.

The shape of each of the first and second antennas 42a and 42b is set so as to have a reduced difference between sensitivity in the corner portion and sensitivity in a part other than the corner portion. A plurality of aspects below will illustrate the shape of the antenna 42 that results in the reduced difference in the sensitivity between the corner portion and the part other than the corner portion. In the following description, the first antenna 42a and the second antenna 42b will not be distinguished from each other but simply referred to as the antenna 42.

Note that the corner portion refers to a part of the antenna 42 that is provided along the corner and a predetermined range on both sides of the corner (such as the corner and a range of two to five centimeters on both sides of the corner) of the detection target area. The corner portion may correspond to a range included in a flat area 60 (to be described) arranged at a position (corner position) which includes one corner of an antenna of the related art as illustrated in FIG. 10 and has the highest sensitivity, the flat area corresponding to a human hand or finger that performs the return operation.

<First Aspect>

Figure 4:
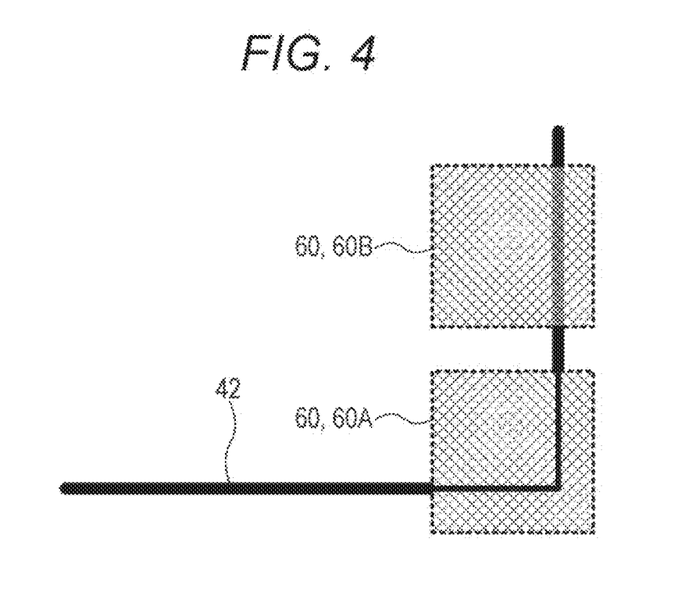
FIG. 4 is a diagram illustrating the antenna of a first aspect.

FIGS. 3 and 4 each illustrate the antenna 42 that is wired to form a corner in the corner portion and is smaller in thickness (line thickness) in the corner portion than the part other than the corner portion, thereby resulting in a reduced difference in the sensitivity between the corner portion and the part other than the corner portion.

A square flat area 60 of a predetermined size corresponding to a human hand or finger that performs the return operation is defined as illustrated in FIG. 4. The antenna 42 is made smaller in thickness in the corner portion than the part other than the corner portion so as to reduce a difference in the areas of the antenna 42 included in flat areas 60A and 60B between when the flat area 60 is arranged in the corner port on (a corner position (60A in the figure)) of the antenna 42 and when the flat area is arranged in the part other than the corner portion (a non-corner position (60B in the figure)). The corner position is preferably a position including the corner of the antenna 42 in the flat area 60 and having the highest sensitivity. The part of the antenna included in the flat area 60 arranged at the corner position is the corner portion of the antenna 42.

In the example of FIG. 4, the entire part (corner portion) of the antenna 42 included in the flat area 60A arranged at the corner position is thinner than the antenna 42 in the other part. It is preferred to set the thickness such that the area of the antenna 42 included in the flat area 60B at the non-corner position is equal to the area of the antenna 42 included in the flat area 60A at the corner position. Note that only a part of the corner portion may be made thin.

The flat area 60 has the size corresponding to the human hand or finger performing the return operation so that, when the area of the antenna 42 included in the flat area 60 is equal between the corner portion and the part other than the corner portion, the relationship $C=\varepsilon_0\varepsilon_s \times S \div L$, applies to result in the same stray capacitance generated between the human. hand or finger and the antenna 42 between when the hand or finger approaches the corner portion of the antenna 42 up to a distance L from the corner portion, and when the hand or finger approaches the part other than the corner portion of the antenna 42 up to the same distance L from the part other than the corner portion. Therefore, when the area of the antenna 42 included in the flat area 60 of the size corresponding to the human hand or finger performing the return operation is equal between the corner portion and the part other than the corner portion, the distance (sensitivity) at (with) which the human body sensor 40 detects a human body on the basis of a change in the capacitance is also equal between the corner portion and the part other than the corner portion.

The flat area 60 can be a square with one side being approximately five to seven centimeters, or a circle with the diameter being approximately five to seven centimeters, for example. The size and shape of the flat area 60 may be of an electrode corresponding to the human hand or finger that performs the return operation.

<Second Aspect>

Figure 5:
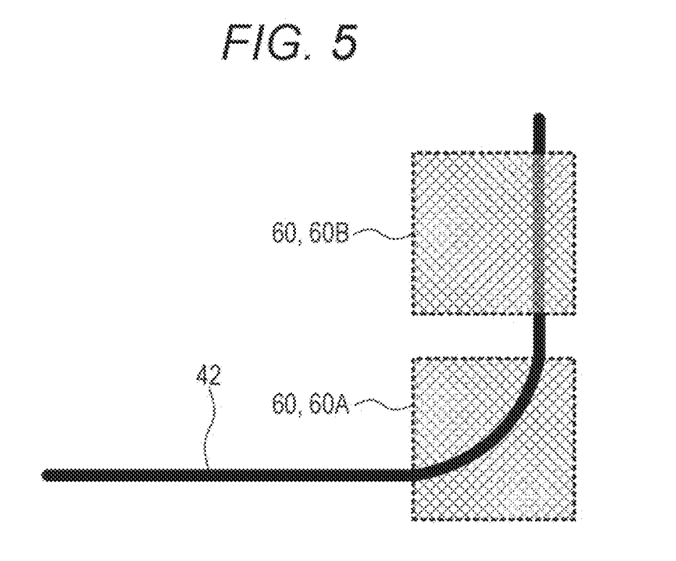
FIG. 5 is a diagram illustrating the antenna of a second aspect.

FIG. 5 illustrates a case where the antenna 42 is wired in a curve without forming a corner in the corner portion to have a reduced difference in the sensitivity between the corner portion and the part other than the corner portion.

As with the case of FIG. 4, the antenna 42 is curved in the corner portion such that, as compared to the case where the antenna forms the corner without being curved, the difference in the areas of the antenna 42 included in the flat areas 60A and 60B is reduced between when the flat area 60 is arranged at the corner position (60A in the figure) and when the flat area is arranged at the non-corner position (60B in the figure).

In the example of FIG. 5, the antenna 42 is curved 90 degrees over the entire portion (corner portion) included in the flat area 60A that is arranged at the corner position. Alternatively, the radius of the curve may be reduced so that the antenna is bent by a required angle in a part of the corner portion. The larger the curve, the smaller the area of the antenna 42 included in the flat area 60A.

<Third Aspect>

Figure 6:
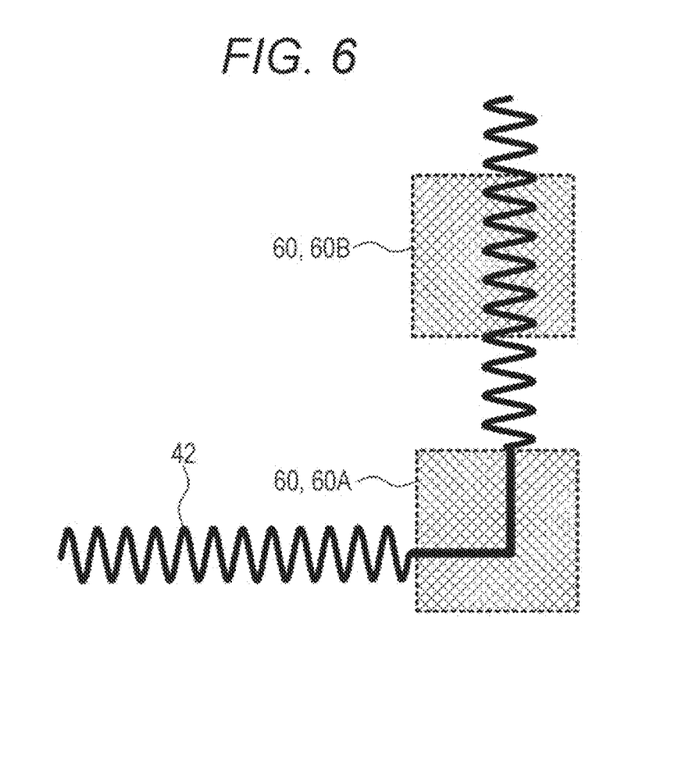
FIG. 6 is a diagram illustrating the antenna of a third aspect.

FIG. 6 illustrates the antenna 42 that is wired while meandering in the part other than the corner portion and without meandering in the corner portion to have a reduced difference in the sensitivity between the corner portion and the part other than the corner portion. The meandering increases the area of the antenna 42 per unit length in the direction along the periphery of the detection target area, as compared to when the antenna does not meander.

The antenna 42 is wired without meandering in the corner portion and while meandering in the part other than the corner portion such that, as with the case of FIGS. 4 and 5, the difference in the areas of the antenna 42 included in the flat areas 60A and 60B is reduced (preferably reduced to zero) between when the flat area 60 is arranged at the corner position (60A in the figure) and when the flat area is arranged at the non-corner position (60B in the figure). In the example of FIG. 6, the antenna 42 is wired without meandering over the entire portion (corner portion) included in the flat area 60A arranged at the corner position, and is wired while meandering in the other part. The antenna instead may be wired without meandering only in a part of the corner portion.

<Fourth Aspect>

Figure 7:
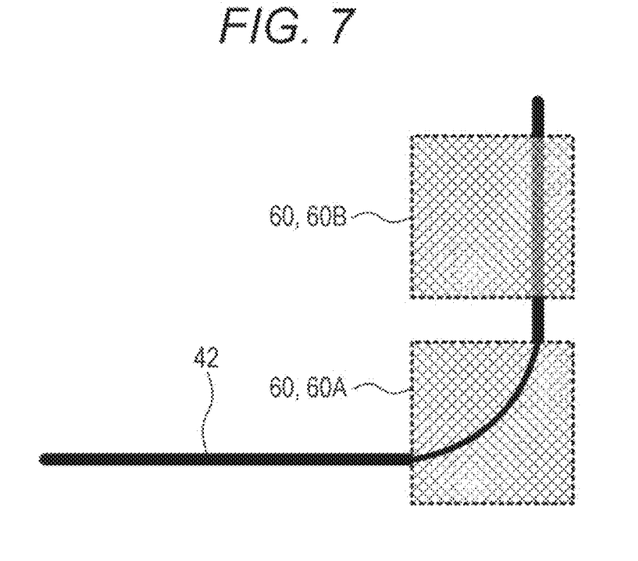
FIG. 7 is a diagram illustrating the antenna of a fourth aspect.

In a fourth aspect illustrated in FIG. 7, the antenna 42 is thinner in the corner portion than the part other than the corner portion and curved in the corner portion to thus have a reduced difference in the sensitivity between the corner portion and the part other than the corner portion. In this case as well, the difference in the areas of the antenna 42 included in the flat areas 60A and 60B is reduced between when the flat area 60 is arranged at the corner position (60A in the figure) and when the flat area is arranged at the non-corner position (60B in the figure).

<Fifth Aspect>

Figure 8:
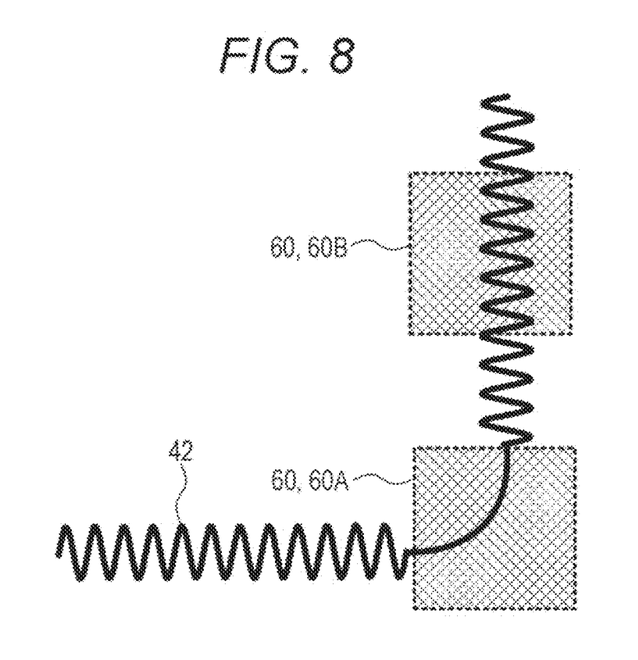
FIG. 8 is a diagram illustrating the antenna of a fifth aspect.

In a fifth aspect illustrated in FIG. 8, the antenna 42 is wired in a curve without meandering in the corner portion and wired while meandering in the part other than the corner portion to thus have a reduced difference in the sensitivity between the corner portion and the part other than the corner portion. In this case as well, the difference in the areas of the antenna 42 included in the flat areas 60A and 60B is reduced between when the flat area 60 is arranged at the corner position (60A in the figure) and when the flat area is arranged at the non-corner position (60B in the figure).

The difference in the sensitivity between the corner portion and the part other than the corner portion of the antenna 42 can thus be reduced by shaping the antenna 42 at least to be wired in the curve without forming the corner in the corner portion, to be thinner in the corner portion than the part other than the corner portion, or to be wired without meandering the corner portion and wired while meandering in the part other than the corner portion. That is, in a more general sense, the difference in the sensitivity can be reduced by setting the shape of each part of the antenna 42 so as reduce the difference in the areas of the antenna included in the flat area 60 between when the predetermined flat area 60 corresponding to the human hand or finger performing the return operation is arranged in the corner portion of the antenna 42 and when the flat area is arranged in the part other than the corner portion of the antenna 42. As a result, a person merely standing near the apparatus is not falsely detected as a human body that performs the return operation, whereby the sensitivity of the human body sensor 40 as a whole can be increased.

Although an embodiment of the present invention has been described with reference to the drawings, specific structures are not limited to the ones illustrated in the embodiment, where modifications and additions made within the scope of the present invention are also included in the present invention.

In the embodiment, the display surface of the liquid crystal display 32 is set as the detection target area, along the periphery of which the antenna 42 is wired. However, the detection target area may be set to any site as long as the site receives the return operation from a user. The part where the hard hey 33 is installed may be included in the detection target area, for example.

Although the corner portion of the detection target area is the 90-degree corner in the example illustrated in the embodiment, the angle need not be 90 degrees. The detection target area in the shape of a regular hexagon, for example, may have the corner portion corresponding to each apex and a predetermined range on both sides of the apex of the hexagon.

The power saving mode may have a plurality of levels with different amounts of power consumption. In this case, the human body sensor 40 may detect a return from the power saving mode in the level with the least amount of power consumption.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising a capacitive human body sensor that detects an operation to return to a normal mode from a power saving mode consuming less power than the normal mode, wherein an antenna of the human body sensor is wired along a periphery of a predetermined detection target area which can receive the operation to return from a user, and a difference in sensitivity between a corner portion and a part other than the corner portion of the antenna is reduced by shaping the antenna at least to be wired in a curve without forming a corner in the corner portion, to be thinner in the corner portion than in the part other than the corner portion, or to be wired without meandering in the corner portion and wired while meandering in the part other than the corner portion.

2. The image forming apparatus according to claim 1, wherein the detection target area is set to an area in which an operation panel or a touch panel is arranged.

3. An image forming apparatus comprising a capacitive human body sensor that detects an operation to return to a normal mode from a power saving mode consuming less power than the normal mode, wherein an antenna of the human body sensor is wired along a periphery of a predetermined detection target area which can receive the operation to return from a user, and a difference in sensitivity between a corner portion and a part other than the corner portion of the antenna is reduced by setting the shape of each part of the antenna so as to have a reduced difference in areas of the antenna included in a predetermined flat area between when the flat area is arranged in the corner portion of the antenna and when the flat area is arranged in the part other than the corner portion of the antenna, the flat area corresponding to a human hand or finger that performs the operation to return.

4. The image forming apparatus according to claim 3, wherein the antenna is wired to form a corner in the corner portion, and the antenna is thinner in the corner portion than in the part other than the corner portion to have the reduced difference in areas.

5. The image forming apparatus according to claim 3, wherein the antenna is wired in a curve without forming a corner in the corner portion to have the reduced difference in areas.

6. The image forming apparatus according to claim 3, wherein the antenna is wired without meandering in the corner portion and wired while meandering in the part other than the corner portion to have the reduced difference in areas.

7. The image forming apparatus according to claim 3, wherein the detection target area is set to an area in which an operation panel or a touch panel is arranged.

* * * * *